United States Patent
Kinoshita

(10) Patent No.: US 11,416,519 B2
(45) Date of Patent: Aug. 16, 2022

(54) INFORMATION PROCESSING APPARATUS, INFORMATION PROCESSING SYSTEM, AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Satoshi Kinoshita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 184 days.

(21) Appl. No.: 16/447,975

(22) Filed: Jun. 21, 2019

(65) Prior Publication Data

US 2020/0004760 A1    Jan. 2, 2020

(30) Foreign Application Priority Data

Jul. 2, 2018   (JP) .............................. JP2018-126363

(51) Int. Cl.
*G06F 17/00*    (2019.01)
*G06F 16/28*    (2019.01)

(52) U.S. Cl.
CPC ................................ *G06F 16/285* (2019.01)

(58) Field of Classification Search
CPC ...... G06F 16/285; G06F 16/287; G06F 16/93; G06F 16/16
See application file for complete search history.

(56) References Cited

U.S. PATENT DOCUMENTS

| | | | |
|---|---|---|---|
| 7,523,120 B2 * | 4/2009 | Numata | G06F 16/93 |
| 9,710,538 B2 * | 7/2017 | Fukuda | G06F 16/285 |
| 2009/0132497 A1 * | 5/2009 | Nagai | G06F 16/93 |
| 2009/0138492 A1 * | 5/2009 | Park | G06F 16/16 |
| 2011/0107198 A1 | 5/2011 | Kuroda | |
| 2018/0060398 A1 * | 3/2018 | Johnson | G06F 16/24554 |
| 2019/0050755 A1 * | 2/2019 | Murakami | G06F 16/285 |
| 2019/0272470 A1 * | 9/2019 | Bandi | G06K 9/6253 |

FOREIGN PATENT DOCUMENTS

| | | |
|---|---|---|
| JP | H0551248 | 8/1993 |
| JP | 2009123022 | 6/2009 |
| JP | 2011095997 | 5/2011 |

* cited by examiner

*Primary Examiner* — Greta L Robinson
(74) *Attorney, Agent, or Firm* — JCIPRNET

(57) ABSTRACT

An information processing apparatus includes an acquisition unit that acquires source information of a transfer source, which includes plural elements to which attribute information has been assigned, and limit information indicating the number of elements storable in a transfer destination, and a generation unit that classifies the elements by using the attribute information of each of the elements in the source information and generates a hierarchical structure of the source information by using a unit of a classification as a unit of a class, so as to correspond to the number of elements indicated by the limit information in the transfer destination.

13 Claims, 16 Drawing Sheets

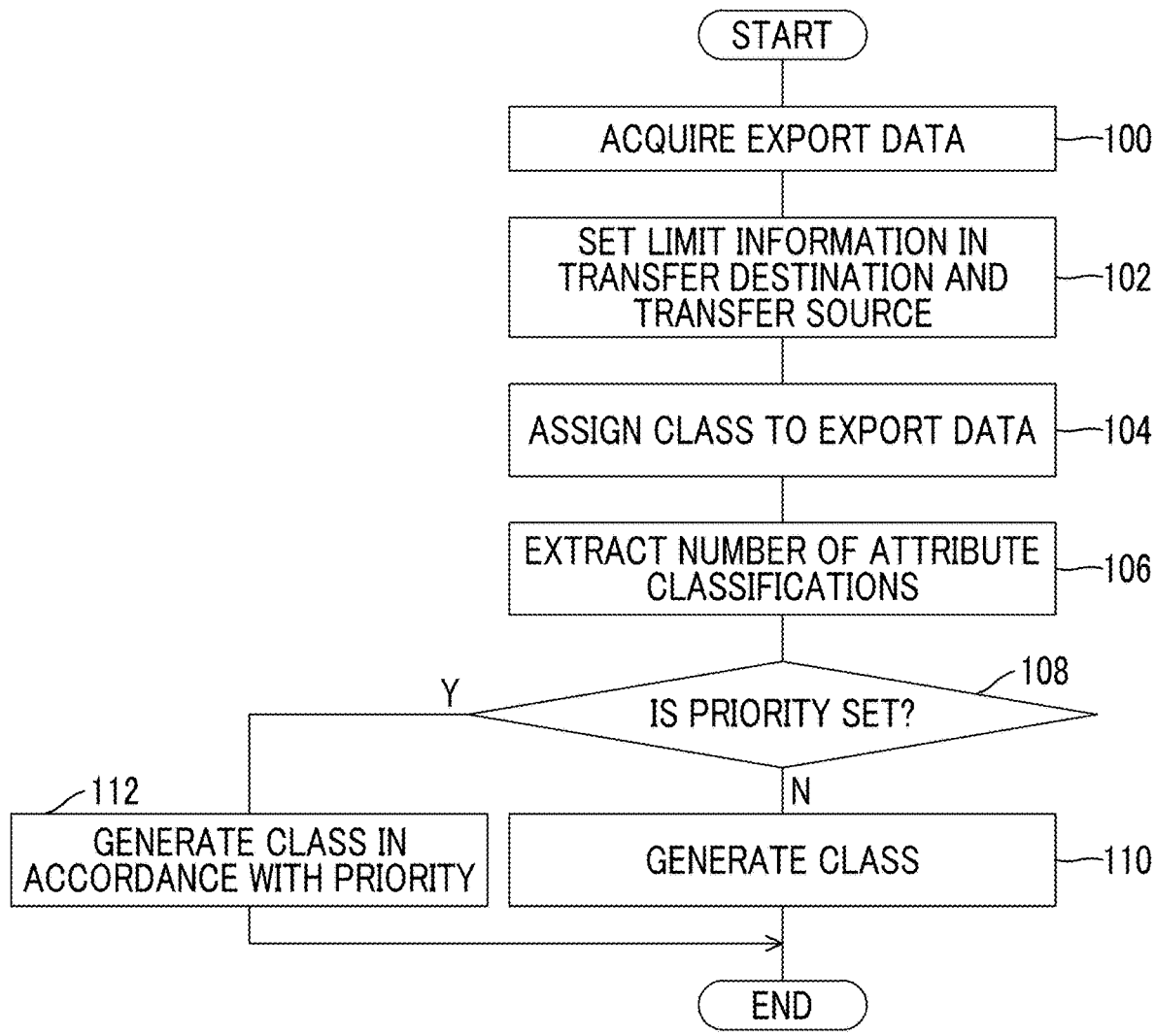

FIG. 6

| ID | FILE NAME | CLASS | FUNCTION | DOCUMENT TYPE | VERSION | UPDATE DATE |
|---|---|---|---|---|---|---|
| 1001 | A FUNCTION SPECIFICATION DOCUMENT | SW PRODUCT\1.0 | A FUNCTION | SPECIFICATION DOCUMENT | 1.0.0 | 12/01/2015 |
| 1002 | A-1 FUNCTION SPECIFICATION DOCUMENT | SW PRODUCT\1.1 | A-1 FUNCTION | DESIGN DESCRIPTION | 1.1.0 | 04/16/2016 |
| 1003 | A-3 FUNCTION SPECIFICATION DOCUMENT | SW PRODUCT\2.0 | A-3 FUNCTION | TEST DESIGN DESCRIPTION | 2.0.0 | 07/01/2017 |
| 1004 | AAA | SW PRODUCT\1.0 | A FUNCTION | SPECIFICATION DOCUMENT | 1.0.0 | 12/01/2015 |
| 1005 | AA-1 | SW PRODUCT\1.0 | A FUNCTION | SPECIFICATION DOCUMENT | 1.0.0 | 01/07/2016 |
| 1006 | AA-2 | SW PRODUCT\1.0 | A FUNCTION | SPECIFICATION DOCUMENT | 1.0.0 | 01/15/2016 |
| 1007 | AA-3 | SW PRODUCT\1.1 | A FUNCTION | SPECIFICATION DOCUMENT | 1.1.0 | 04/16/2016 |
| 1008 | AAA | SW PRODUCT\1.1 | A FUNCTION | TEST DESIGN DESCRIPTION | 1.1.0 | 05/11/2016 |
| 1009 | BBB | SW PRODUCT\1.1 | B FUNCTION | SPECIFICATION DOCUMENT | 1.1.0 | 04/16/2016 |
| 1010 | BB-1 | SW PRODUCT\1.1 | B FUNCTION | SPECIFICATION DOCUMENT | 1.1.0 | 05/11/2016 |
| 1011 | BB-2 | SW PRODUCT\1.1 | B FUNCTION | SPECIFICATION DOCUMENT | 1.1.0 | 05/12/2016 |
| 1012 | BB-3 | SW PRODUCT\1.1 | B FUNCTION | SPECIFICATION DOCUMENT | 1.1.0 | 05/13/2016 |
| 1013 | BB-4 | SW PRODUCT\2.0 | B FUNCTION | SPECIFICATION DOCUMENT | 1.0.0 | 07/03/2017 |
| 1014 | CCC | SW PRODUCT\1.0 | C FUNCTION | SPECIFICATION DOCUMENT | 1.0.0 | 12/01/2015 |
| 1015 | CC-1 | SW PRODUCT\1.0 | C FUNCTION | SPECIFICATION DOCUMENT | 1.0.0 | 01/07/2016 |
| 1016 | CC-2 | SW PRODUCT\1.0 | C FUNCTION | SPECIFICATION DOCUMENT | 1.0.0 | 01/15/2016 |
| 1017 | CC-3 | SW PRODUCT\1.1 | C FUNCTION | SPECIFICATION DOCUMENT | 1.1.0 | 04/16/2016 |
| 1018 | DDD | SW PRODUCT\1.0 | D FUNCTION | SPECIFICATION DOCUMENT | 1.0.0 | 12/01/2015 |
| 1019 | DD-1 | SW PRODUCT\1.0 | D FUNCTION | SPECIFICATION DOCUMENT | 1.0.0 | 12/02/2015 |
| 1020 | DD-2 | SW PRODUCT\1.0 | D FUNCTION | SPECIFICATION DOCUMENT | 1.0.0 | 12/03/2015 |
| 1021 | DD-3 | SW PRODUCT\1.0 | D FUNCTION | SPECIFICATION DOCUMENT | 1.0.0 | 12/04/2015 |
| 1022 | DD-4 | SW PRODUCT\1.0 | D FUNCTION | SPECIFICATION DOCUMENT | 1.0.0 | 12/05/2015 |
| 1023 | DD-5 | SW PRODUCT\1.0 | D FUNCTION | SPECIFICATION DOCUMENT | 1.0.0 | 12/06/2015 |
| 1024 | DD-6 | SW PRODUCT\1.0 | D FUNCTION | SPECIFICATION DOCUMENT | 1.0.0 | 12/07/2015 |
| 1025 | DD-7 | SW PRODUCT\1.1 | D FUNCTION | SPECIFICATION DOCUMENT | 1.1.0 | 04/16/2016 |
| 1026 | DD-8 | SW PRODUCT\1.1 | D FUNCTION | SPECIFICATION DOCUMENT | 1.1.0 | 05/10/2017 |
| 1027 | DD-9 | SW PRODUCT\1.1 | D FUNCTION | SPECIFICATION DOCUMENT | 1.1.0 | 04/16/2016 |
| 1028 | DD-10 | SW PRODUCT\2.0 | D FUNCTION | SPECIFICATION DOCUMENT | 2.0.0 | 07/01/2017 |
| 1029 | DD-11 | SW PRODUCT\2.0 | D FUNCTION | SPECIFICATION DOCUMENT | 2.0.0 | 07/01/2017 |
| 1030 | DD-12 | SW PRODUCT\2.0 | D FUNCTION | SPECIFICATION DOCUMENT | 2.0.0 | 07/01/2017 |
| 1031 | ARRANGEMENT PROCEDURE 1.0 | SERVICE\1.0 | ARRANGEMENT FUNCTION | SPECIFICATION DOCUMENT | 1.0.0 | 05/06/2017 |
| 1032 | ARRANGEMENT PROCEDURE 1.0-1 | SERVICE\1.0 | ARRANGEMENT FUNCTION | SPECIFICATION DOCUMENT | 1.0.0 | 05/10/2017 |
| 1033 | ARRANGEMENT PROCEDURE 1.0-2 | SERVICE\1.0 | ARRANGEMENT FUNCTION | SPECIFICATION DOCUMENT | 1.0.0 | 05/14/2017 |
| 1034 | ARRANGEMENT PROCEDURE 1.0-3 | SERVICE\1.0 | ARRANGEMENT FUNCTION | SPECIFICATION DOCUMENT | 1.0.0 | 05/20/2017 |
| 1035 | ARRANGEMENT PROCEDURE 1.0-4 | SERVICE\1.0 | ARRANGEMENT FUNCTION | SPECIFICATION DOCUMENT | 1.0.0 | 05/21/2017 |
| 1036 | MANAGEMENT ver1-k1 | SERVICE\1.0 | SERVICE MANAGEMENT FUNCTION | SPECIFICATION DOCUMENT | 1.0.0 | 05/22/2017 |
| 1037 | MANAGEMENT ver1-k2 | SERVICE\1.0 | SERVICE MANAGEMENT FUNCTION | SPECIFICATION DOCUMENT | 1.0.0 | 05/23/2017 |
| 1038 | MANAGEMENT ver1-k3 | SERVICE\1.0 | SERVICE MANAGEMENT FUNCTION | SPECIFICATION DOCUMENT | 1.0.0 | 05/24/2017 |
| 1039 | MANAGEMENT ver1-k4 | SERVICE\1.0 | SERVICE MANAGEMENT FUNCTION | SPECIFICATION DOCUMENT | 1.0.0 | 05/25/2017 |
| 1040 | MANAGEMENT ver1-k5 | SERVICE\1.0 | SERVICE MANAGEMENT FUNCTION | SPECIFICATION DOCUMENT | <NONE> | 05/26/2017 |
| 1041 | MANAGEMENT ver1-k6 | SERVICE\1.0 | SERVICE MANAGEMENT FUNCTION | SPECIFICATION DOCUMENT | 1.0.0 | 05/27/2017 |
| 1042 | tehai001.xls | SERVICE\1.0 | ARRANGEMENT FUNCTION | DESIGN DESCRIPTION | 1.0.0 | 05/28/2017 |
| 1043 | tehai002.xls | SERVICE\1.0 | ARRANGEMENT FUNCTION | DESIGN DESCRIPTION | 1.0.0 | 05/29/2017 |
| 1044 | tehai003.xls | SERVICE A\1.0 | ARRANGEMENT FUNCTION | <NONE> | 1.0.0 | 05/30/2017 |
| 1045 | tehai004.xls | SERVICE A\1.0 | ARRANGEMENT FUNCTION | <NONE> | 1.0.0 | 05/31/2017 |
| 1046 | SPECIFICATION 1.doc | SERVICE C | ARRANGEMENT FUNCTION | SPECIFICATION DOCUMENT | 1.1.0 | 08/04/2017 |
| 1047 | SPECIFICATION 2.doc | SERVICE C | ARRANGEMENT FUNCTION | SPECIFICATION DOCUMENT | 1.1.0 | 08/10/2017 |
| 1048 | SPECIFICATION 3.doc | SERVICE C | ARRANGEMENT FUNCTION | SPECIFICATION DOCUMENT | 1.1.0 | 08/16/2017 |
| 1049 | SPECIFICATION 3.doc | SERVICE C | ARRANGEMENT FUNCTION | SPECIFICATION DOCUMENT | 1.1.0 | 08/22/2017 |
| 1050 | SPECIFICATION 5.doc | SERVICE C | SERVICE MANAGEMENT FUNCTION | SPECIFICATION DOCUMENT | 1.1.0 | 08/28/2017 |
| 1051 | SPECIFICATION 6.doc | SERVICE C | SERVICE MANAGEMENT FUNCTION | SPECIFICATION DOCUMENT | 1.1.0 | 07/04/2017 |
| 1052 | SPECIFICATION 7.doc | SERVICE C | SERVICE MANAGEMENT FUNCTION | SPECIFICATION DOCUMENT | 1.1.0 | 07/10/2017 |
| 1053 | SPECIFICATION 8.doc | SERVICE C | SERVICE MANAGEMENT FUNCTION | SPECIFICATION DOCUMENT | 1.1.0 | 07/16/2017 |
| 1054 | xxx1.doc | SERVICE C | <NONE> | DESIGN DESCRIPTION | 1.1.0 | 07/22/2017 |
| 1055 | AA-1 | SERVICE C | ARRANGEMENT FUNCTION | DESIGN DESCRIPTION | 1.1.0 | 07/28/2017 |
| 1056 | AA-1 | SERVICE C | ARRANGEMENT FUNCTION | <NONE> | 1.1.0 | 08/03/2017 |
| 1057 | AA-1 | SERVICE C | ARRANGEMENT FUNCTION | <NONE> | 1.1.0 | 08/08/2017 |

FIG. 7

| | | | | | | |
|---|---|---|---|---|---|---|
| 1058 | AA-1 | SERVICE C | <NONE> | DESIGN DESCRIPTION | 1.1.0 | 08/15/2017 |
| 1059 | AA-1 | SERVICE C | SERVICE MANAGEMENT FUNCTION | DESIGN DESCRIPTION | 1.1.0 | 08/21/2017 |
| 1060 | AA-1 | SERVICE C | SERVICE MANAGEMENT FUNCTION | <NONE> | 1.1.0 | 08/27/2017 |
| 1061 | AA-1 | SERVICE C | SERVICE MANAGEMENT FUNCTION | <NONE> | 1.1.0 | 09/02/2017 |
| 1062 | xxx1-1.doc | SERVICE D\DOCUMENT MANAGEMENT | FUNCTION A | SPECIFICATION DOCUMENT | 1.1.0 | 02/16/2017 |
| 1063 | xxx1-2.doc | SERVICE D\DOCUMENT MANAGEMENT | FUNCTION A | SPECIFICATION DOCUMENT | 1.1.0 | 02/25/2017 |
| 1064 | xxx1-3.doc | SERVICE D\DOCUMENT MANAGEMENT | FUNCTION A | SPECIFICATION DOCUMENT | 1.1.0 | 03/06/2017 |
| 1065 | xxx1-4.doc | SERVICE D\DOCUMENT MANAGEMENT | FUNCTION A | SPECIFICATION DOCUMENT | 1.1.0 | 03/15/2017 |
| 1066 | xxx1-5.doc | SERVICE D\DOCUMENT MANAGEMENT | FUNCTION A | SPECIFICATION DOCUMENT | 1.1.0 | 03/24/2017 |
| 1067 | xxx1-6.doc | SERVICE D\DOCUMENT MANAGEMENT | FUNCTION A | SPECIFICATION DOCUMENT | 1.1.0 | 04/02/2017 |
| 1068 | xxx1-7.doc | SERVICE D\DOCUMENT MANAGEMENT | FUNCTION A | SPECIFICATION DOCUMENT | 1.1.0 | 04/11/2017 |
| 1069 | xxx1-8.doc | SERVICE D\DOCUMENT MANAGEMENT | FUNCTION A | DESIGN DESCRIPTION | 1.1.0 | 04/20/2017 |
| 1070 | xxx1-9.doc | SERVICE D\DOCUMENT MANAGEMENT | FUNCTION A | DESIGN DESCRIPTION | 1.1.0 | 04/29/2017 |
| 1071 | xxx1-10.doc | SERVICE D\DOCUMENT MANAGEMENT | FUNCTION A | DESIGN DESCRIPTION | 2.0.0 | 10/11/2017 |
| 1072 | xxx1-11.doc | SERVICE D\DOCUMENT MANAGEMENT | FUNCTION A | DESIGN DESCRIPTION | 2.0.0 | 10/12/2017 |
| 1073 | xxx1-12.doc | SERVICE D\DOCUMENT MANAGEMENT | FUNCTION A | DESIGN DESCRIPTION | 2.0.0 | 10/13/2017 |
| 1074 | xxx1-13.doc | SERVICE D\DOCUMENT MANAGEMENT | FUNCTION A | DESIGN DESCRIPTION | 2.0.0 | 10/14/2017 |
| 1075 | xxx1-14.doc | SERVICE D\DOCUMENT MANAGEMENT | FUNCTION A | DESIGN DESCRIPTION | 2.0.0 | 10/15/2017 |
| 1076 | xxx1-15.doc | SERVICE D\DOCUMENT MANAGEMENT | FUNCTION B | SPECIFICATION DOCUMENT | 2.0.0 | 10/16/2017 |
| 1077 | xxx1-16.doc | SERVICE D\DOCUMENT MANAGEMENT | FUNCTION B | DESIGN DESCRIPTION | 2.0.0 | 10/17/2017 |
| 1078 | xxx1-17.doc | SERVICE D\DOCUMENT MANAGEMENT | FUNCTION B | DESIGN DESCRIPTION | 2.0.0 | 10/18/2017 |
| 1079 | xxx1-18.doc | SERVICE D\DOCUMENT MANAGEMENT | FUNCTION B | DESIGN DESCRIPTION | 2.0.0 | 10/19/2017 |
| 1080 | xxx1-19.doc | SERVICE D\DOCUMENT MANAGEMENT | FUNCTION B | DESIGN DESCRIPTION | 2.0.0 | 10/19/2017 |
| 1081 | x2-101.doc | SERVICE D\SERVICE MANAGEMENT | MENU-1 | <NONE> | 1.1.0 | 04/11/2015 |
| 1082 | x2-102.doc | SERVICE D\SERVICE MANAGEMENT | MENU-1 | <NONE> | 1.1.0 | 04/12/2015 |
| 1083 | x2-103.doc | SERVICE D\SERVICE MANAGEMENT | MENU-1 | <NONE> | 1.1.0 | 04/13/2015 |
| 1084 | x2-104.doc | SERVICE D\SERVICE MANAGEMENT | MENU-1 | <NONE> | 1.1.0 | 04/14/2015 |
| 1085 | x2-105.doc | SERVICE D\SERVICE MANAGEMENT | MENU-1 | <NONE> | 1.1.0 | 04/15/2015 |
| 1086 | x2-106.doc | SERVICE D\SERVICE MANAGEMENT | MENU-1 | <NONE> | 1.1.0 | 04/16/2015 |
| 1087 | x2-107.doc | SERVICE D\SERVICE MANAGEMENT | MENU-1 | <NONE> | 1.1.0 | 04/17/2015 |
| 1088 | x2-108.doc | SERVICE D\SERVICE MANAGEMENT | MENU-1 | <NONE> | 1.1.0 | 04/18/2015 |
| 1089 | x2-109.doc | SERVICE D\SERVICE MANAGEMENT | MENU-1 | <NONE> | 2.0.0 | 04/11/2016 |
| 1090 | x2-110.doc | SERVICE D\SERVICE MANAGEMENT | MENU-1 | <NONE> | 2.0.0 | 04/12/2016 |
| 1091 | x2-111.doc | SERVICE D\SERVICE MANAGEMENT | MENU-1 | <NONE> | 2.0.0 | 04/13/2016 |
| 1092 | x2-112.doc | SERVICE D\SERVICE MANAGEMENT | MENU-1 | <NONE> | 2.0.0 | 04/14/2016 |
| 1093 | x2-113.doc | SERVICE D\SERVICE MANAGEMENT | MENU-1 | <NONE> | 2.0.0 | 04/15/2016 |
| 1094 | x2-114.doc | SERVICE D\SERVICE MANAGEMENT | MENU-1 | <NONE> | 2.0.0 | 04/16/2016 |
| 1095 | x2-115.doc | SERVICE D\SERVICE MANAGEMENT | MENU-2 | <NONE> | 2.0.0 | 04/17/2016 |
| 1096 | x2-116.doc | SERVICE D\SERVICE MANAGEMENT | MENU-2 | <NONE> | 2.0.0 | 04/18/2016 |
| 1097 | x2-117.doc | SERVICE D\SERVICE MANAGEMENT | MENU-2 | <NONE> | 2.0.0 | 04/19/2016 |
| 1098 | x2-118.doc | SERVICE D\SERVICE MANAGEMENT | MENU-2 | <NONE> | 2.0.0 | 04/20/2016 |
| 1099 | x2-119.doc | SERVICE D\SERVICE MANAGEMENT | MENU-2 | <NONE> | 2.0.0 | 04/21/2016 |
| 1100 | x2-120.doc | SERVICE D\SERVICE MANAGEMENT | MENU-2 | <NONE> | 2.0.0 | 04/22/2016 |
| 1101 | x2-121.doc | SERVICE D\SERVICE MANAGEMENT | MENU-2 | <NONE> | 2.0.0 | 04/23/2016 |
| 1102 | x2-122.doc | SERVICE D\SERVICE MANAGEMENT | MENU-2 | <NONE> | 2.0.0 | 04/24/2016 |
| 1103 | x2-123.doc | SERVICE D\SERVICE MANAGEMENT | MENU-2 | <NONE> | 2.0.0 | 04/25/2016 |
| 1104 | x2-124.doc | SERVICE D\SERVICE MANAGEMENT | MENU-2 | <NONE> | 2.0.0 | 04/26/2016 |
| 1105 | x2-125.doc | SERVICE D\SERVICE MANAGEMENT | MENU-2 | <NONE> | 2.0.0 | 04/27/2016 |
| 1106 | x2-126.doc | SERVICE D\SERVICE MANAGEMENT | MENU-2 | <NONE> | 2.0.0 | 04/28/2016 |
| 1107 | x2-127.doc | SERVICE D\SERVICE MANAGEMENT | MENU-2 | <NONE> | 2.0.0 | 04/29/2016 |
| 1108 | x2-128.doc | SERVICE D\SERVICE MANAGEMENT | MENU-2 | <NONE> | 2.0.0 | 04/30/2016 |
| 1109 | x2-129.doc | SERVICE D\SERVICE MANAGEMENT | MENU-2 | <NONE> | 2.0.0 | 05/01/2016 |
| 1110 | x2-130.doc | SERVICE D\SERVICE MANAGEMENT | MENU-2 | <NONE> | 2.0.0 | 05/02/2016 |
| 1111 | x2-131.doc | SERVICE D\SERVICE MANAGEMENT | MENU-2 | <NONE> | 2.0.0 | 05/03/2016 |
| 1112 | x2-132.doc | SERVICE D\SERVICE MANAGEMENT | MENU-2 | <NONE> | 2.0.0 | 05/04/2016 |
| 1113 | x2-133.doc | SERVICE D\SERVICE MANAGEMENT | MENU-2 | <NONE> | 2.0.0 | 05/05/2016 |
| 1114 | x2-134.doc | SERVICE D\SERVICE MANAGEMENT | MENU-2 | <NONE> | 2.0.0 | 05/06/2016 |

FIG. 8

| ITEM | TRANSFER SOURCE | TRANSFER DESTINATION | NOTE |
|---|---|---|---|
| NUMBER OF ELEMENTS OF IDENTICAL CLASS | ⟨NOT LIMITED⟩ | 20 | INPUT VALUE FOR LIMIT |

FIG. 9

| ID | FILE NAME | CLASS | FUNCTION | DOCUMENT TYPE | VERSION | UPDATE DATE | | |
|---|---|---|---|---|---|---|---|---|
| 1001 | A FUNCTION SPECIFICATION DOCUMENT | SW PRODUCT\1.0 | A FUNCTION | SPECIFICATION DOCUMENT | 1.0.0 | 12/01/2015 | SW PRODUCT | 1.0 |
| 1002 | A-1 FUNCTION SPECIFICATION DOCUMENT | SW PRODUCT\1.1 | A-1 FUNCTION | DESIGN DESCRIPTION | 1.1.0 | 04/18/2016 | SW PRODUCT | 1.1 |
| 1003 | A-3 FUNCTION SPECIFICATION DOCUMENT | SW PRODUCT\2.0 | A-3 FUNCTION | TEST DESIGN DESCRIPTION | 2.0.0 | 07/01/2017 | SW PRODUCT | 2.0 |
| 1004 | AAA | SW PRODUCT\1.0 | A FUNCTION | SPECIFICATION DOCUMENT | 1.0.0 | 12/01/2015 | SW PRODUCT | 1.0 |
| 1005 | AA-1 | SW PRODUCT\1.0 | A FUNCTION | SPECIFICATION DOCUMENT | 1.0.0 | 01/07/2016 | SW PRODUCT | 1.0 |
| 1006 | AA-2 | SW PRODUCT\1.0 | A FUNCTION | SPECIFICATION DOCUMENT | 1.0.0 | 01/15/2016 | SW PRODUCT | 1.0 |
| 1007 | AA-3 | SW PRODUCT\1.1 | A FUNCTION | SPECIFICATION DOCUMENT | 1.1.0 | 04/16/2016 | SW PRODUCT | 1.1 |
| 1008 | AAA | SW PRODUCT\1.1 | A FUNCTION | TEST DESIGN DESCRIPTION | 1.1.0 | 05/11/2016 | SW PRODUCT | 1.1 |
| 1009 | BBB | SW PRODUCT\1.1 | B FUNCTION | SPECIFICATION DOCUMENT | 1.1.0 | 04/18/2016 | SW PRODUCT | 1.1 |
| 1010 | BB-1 | SW PRODUCT\1.1 | B FUNCTION | SPECIFICATION DOCUMENT | 1.1.0 | 05/11/2016 | SW PRODUCT | 1.1 |
| 1011 | BB-2 | SW PRODUCT\1.1 | B FUNCTION | SPECIFICATION DOCUMENT | 1.1.0 | 05/12/2016 | SW PRODUCT | 1.1 |
| 1012 | BB-3 | SW PRODUCT\1.1 | B FUNCTION | SPECIFICATION DOCUMENT | 1.1.0 | 05/13/2016 | SW PRODUCT | 1.1 |
| 1013 | BB-4 | SW PRODUCT\2.0 | B FUNCTION | SPECIFICATION DOCUMENT | 1.0.0 | 07/03/2017 | SW PRODUCT | 2.0 |
| 1014 | CCC | SW PRODUCT\1.0 | C FUNCTION | SPECIFICATION DOCUMENT | 1.0.0 | 12/01/2015 | SW PRODUCT | 1.0 |
| 1015 | CC-1 | SW PRODUCT\1.0 | C FUNCTION | SPECIFICATION DOCUMENT | 1.0.0 | 01/07/2016 | SW PRODUCT | 1.0 |
| 1016 | CC-2 | SW PRODUCT\1.0 | C FUNCTION | SPECIFICATION DOCUMENT | 1.0.0 | 01/15/2016 | SW PRODUCT | 1.0 |
| 1017 | CC-3 | SW PRODUCT\1.1 | C FUNCTION | SPECIFICATION DOCUMENT | 1.1.0 | 04/18/2016 | SW PRODUCT | 1.1 |
| 1018 | DDD | SW PRODUCT\1.0 | D FUNCTION | SPECIFICATION DOCUMENT | 1.0.0 | 12/01/2015 | SW PRODUCT | 1.0 |
| 1019 | DD-1 | SW PRODUCT\1.0 | D FUNCTION | SPECIFICATION DOCUMENT | 1.0.0 | 12/02/2015 | SW PRODUCT | 1.0 |
| 1020 | DD-2 | SW PRODUCT\1.0 | D FUNCTION | SPECIFICATION DOCUMENT | 1.0.0 | 12/03/2015 | SW PRODUCT | 1.0 |
| 1021 | DD-3 | SW PRODUCT\1.0 | D FUNCTION | SPECIFICATION DOCUMENT | 1.0.0 | 12/04/2015 | SW PRODUCT | 1.0 |
| 1022 | DD-4 | SW PRODUCT\1.0 | D FUNCTION | SPECIFICATION DOCUMENT | 1.0.0 | 12/05/2015 | SW PRODUCT | 1.0 |
| 1023 | DD-5 | SW PRODUCT\1.0 | D FUNCTION | SPECIFICATION DOCUMENT | 1.0.0 | 12/06/2015 | SW PRODUCT | 1.0 |
| 1024 | DD-6 | SW PRODUCT\1.0 | D FUNCTION | SPECIFICATION DOCUMENT | 1.0.0 | 12/07/2015 | SW PRODUCT | 1.0 |
| 1025 | DD-7 | SW PRODUCT\1.1 | D FUNCTION | SPECIFICATION DOCUMENT | 1.1.0 | 04/18/2016 | SW PRODUCT | 1.1 |
| 1026 | DD-8 | SW PRODUCT\1.1 | D FUNCTION | SPECIFICATION DOCUMENT | 1.1.0 | 05/10/2017 | SW PRODUCT | 1.1 |
| 1027 | DD-9 | SW PRODUCT\1.1 | D FUNCTION | SPECIFICATION DOCUMENT | 1.1.0 | 04/18/2016 | SW PRODUCT | 1.1 |
| 1028 | DD-10 | SW PRODUCT\2.0 | D FUNCTION | SPECIFICATION DOCUMENT | 2.0.0 | 07/01/2017 | SW PRODUCT | 2.0 |
| 1029 | DD-11 | SW PRODUCT\2.0 | D FUNCTION | SPECIFICATION DOCUMENT | 2.0.0 | 07/01/2017 | SW PRODUCT | 2.0 |
| 1030 | DD-12 | SW PRODUCT\2.0 | D FUNCTION | SPECIFICATION DOCUMENT | 2.0.0 | 07/01/2017 | SW PRODUCT | 2.0 |
| 1031 | ARRANGEMENT PROCEDURE 1.0 | SERVICE\1.0 | ARRANGEMENT FUNCTION | SPECIFICATION DOCUMENT | 1.0.0 | 05/08/2017 | SERVICE 1.0 | 1.0 |
| 1032 | ARRANGEMENT PROCEDURE 1.0-1 | SERVICE\1.0 | ARRANGEMENT FUNCTION | SPECIFICATION DOCUMENT | 1.0.0 | 05/10/2017 | SERVICE 1.0 | 1.0 |
| 1033 | ARRANGEMENT PROCEDURE 1.0-2 | SERVICE\1.0 | ARRANGEMENT FUNCTION | SPECIFICATION DOCUMENT | 1.0.0 | 05/14/2017 | SERVICE 1.0 | 1.0 |
| 1034 | ARRANGEMENT PROCEDURE 1.0-3 | SERVICE\1.0 | ARRANGEMENT FUNCTION | SPECIFICATION DOCUMENT | 1.0.0 | 05/20/2017 | SERVICE 1.0 | 1.0 |
| 1035 | ARRANGEMENT PROCEDURE 1.0-4 | SERVICE\1.0 | ARRANGEMENT FUNCTION | SPECIFICATION DOCUMENT | 1.0.0 | 05/21/2017 | SERVICE 1.0 | 1.0 |
| 1036 | MANAGEMENT ver1-k1 | SERVICE\1.0 | SERVICE MANAGEMENT FUNCTION | SPECIFICATION DOCUMENT | 1.0.0 | 05/22/2017 | SERVICE 1.0 | 1.0 |
| 1037 | MANAGEMENT ver1-k2 | SERVICE\1.0 | SERVICE MANAGEMENT FUNCTION | SPECIFICATION DOCUMENT | 1.0.0 | 05/23/2017 | SERVICE 1.0 | 1.0 |
| 1038 | MANAGEMENT ver1-k3 | SERVICE\1.0 | SERVICE MANAGEMENT FUNCTION | SPECIFICATION DOCUMENT | 1.0.0 | 05/24/2017 | SERVICE 1.0 | 1.0 |
| 1039 | MANAGEMENT ver1-k4 | SERVICE\1.0 | SERVICE MANAGEMENT FUNCTION | SPECIFICATION DOCUMENT | 1.0.0 | 05/25/2017 | SERVICE 1.0 | 1.0 |
| 1040 | MANAGEMENT ver1-k5 | SERVICE\1.0 | SERVICE MANAGEMENT FUNCTION | SPECIFICATION DOCUMENT | <NONE> | 05/26/2017 | SERVICE 1.0 | <NONE> |
| 1041 | MANAGEMENT ver1-k6 | SERVICE\1.0 | SERVICE MANAGEMENT FUNCTION | SPECIFICATION DOCUMENT | 1.0.0 | 05/27/2017 | SERVICE 1.0 | 1.0 |
| 1042 | tehai001.xls | SERVICE\1.0 | ARRANGEMENT FUNCTION | DESIGN DESCRIPTION | 1.0.0 | 05/28/2017 | SERVICE 1.0 | 1.0 |
| 1043 | tehai002.xls | SERVICE\1.0 | ARRANGEMENT FUNCTION | DESIGN DESCRIPTION | 1.0.0 | 05/29/2017 | SERVICE 1.0 | 1.0 |
| 1044 | tehai003.xls | SERVICE A\1.0 | ARRANGEMENT FUNCTION | <NONE> | 1.0.0 | 05/30/2017 | SERVICE A | 1.0 |
| 1045 | tehai004.xls | SERVICE A\1.0 | ARRANGEMENT FUNCTION | <NONE> | 1.0.0 | 05/31/2017 | SERVICE A | 1.0 |
| 1046 | SPECIFICATION 1.doc | SERVICE C | ARRANGEMENT FUNCTION | SPECIFICATION DOCUMENT | 1.1.0 | 06/04/2017 | SERVICE C | <NONE> |
| 1047 | SPECIFICATION 2.doc | SERVICE C | ARRANGEMENT FUNCTION | SPECIFICATION DOCUMENT | 1.1.0 | 06/10/2017 | SERVICE C | <NONE> |
| 1048 | SPECIFICATION 3.doc | SERVICE C | ARRANGEMENT FUNCTION | SPECIFICATION DOCUMENT | 1.1.0 | 06/16/2017 | SERVICE C | <NONE> |
| 1049 | SPECIFICATION 4.doc | SERVICE C | ARRANGEMENT FUNCTION | SPECIFICATION DOCUMENT | 1.1.0 | 06/22/2017 | SERVICE C | <NONE> |
| 1050 | SPECIFICATION 5.doc | SERVICE C | SERVICE MANAGEMENT FUNCTION | SPECIFICATION DOCUMENT | 1.1.0 | 06/28/2017 | SERVICE C | <NONE> |
| 1051 | SPECIFICATION 6.doc | SERVICE C | SERVICE MANAGEMENT FUNCTION | SPECIFICATION DOCUMENT | 1.1.0 | 07/04/2017 | SERVICE C | <NONE> |
| 1052 | SPECIFICATION 7.doc | SERVICE C | SERVICE MANAGEMENT FUNCTION | SPECIFICATION DOCUMENT | 1.1.0 | 07/10/2017 | SERVICE C | <NONE> |
| 1053 | SPECIFICATION 8.doc | SERVICE C | SERVICE MANAGEMENT FUNCTION | SPECIFICATION DOCUMENT | 1.1.0 | 07/16/2017 | SERVICE C | <NONE> |
| 1054 | xxx.doc | SERVICE C | <NONE> | DESIGN DESCRIPTION | 1.1.0 | 07/22/2017 | SERVICE C | <NONE> |
| 1055 | AA-1 | SERVICE C | ARRANGEMENT FUNCTION | DESIGN DESCRIPTION | 1.1.0 | 07/28/2017 | SERVICE C | <NONE> |
| 1056 | AA-1 | SERVICE C | ARRANGEMENT FUNCTION | <NONE> | 1.1.0 | 08/03/2017 | SERVICE C | <NONE> |

FIG. 10

| | | | | | | | | |
|---|---|---|---|---|---|---|---|---|
| 1057 | AA-1 | SERVICE C | ARRANGEMENT FUNCTION | <NONE> | 1.1.0 | 08/09/2017 | SERVICE C | <NONE> |
| 1058 | AA-1 | SERVICE C | <NONE> | DESIGN DESCRIPTION | 1.1.0 | 08/15/2017 | SERVICE C | <NONE> |
| 1059 | AA-1 | SERVICE C | SERVICE MANAGEMENT FUNCTION | DESIGN DESCRIPTION | 1.1.0 | 08/21/2017 | SERVICE C | <NONE> |
| 1060 | AA-1 | SERVICE C | SERVICE MANAGEMENT FUNCTION | <NONE> | 1.1.0 | 08/27/2017 | SERVICE C | <NONE> |
| 1061 | AA-1 | SERVICE C | SERVICE MANAGEMENT FUNCTION | <NONE> | 1.1.0 | 09/02/2017 | SERVICE C | <NONE> |
| 1062 | xxx1-1.doc | SERVICE D\DOCUMENT MANAGEMENT | FUNCTION A | SPECIFICATION DOCUMENT | 1.1.0 | 02/16/2017 | SERVICE D | DOCUMENT MANAGEMENT |
| 1063 | xxx1-2.doc | SERVICE D\DOCUMENT MANAGEMENT | FUNCTION A | SPECIFICATION DOCUMENT | 1.1.0 | 02/25/2017 | SERVICE D | DOCUMENT MANAGEMENT |
| 1064 | xxx1-3.doc | SERVICE D\DOCUMENT MANAGEMENT | FUNCTION A | SPECIFICATION DOCUMENT | 1.1.0 | 03/06/2017 | SERVICE D | DOCUMENT MANAGEMENT |
| 1065 | xxx1-4.doc | SERVICE D\DOCUMENT MANAGEMENT | FUNCTION A | SPECIFICATION DOCUMENT | 1.1.0 | 03/15/2017 | SERVICE D | DOCUMENT MANAGEMENT |
| 1066 | xxx1-5.doc | SERVICE D\DOCUMENT MANAGEMENT | FUNCTION A | SPECIFICATION DOCUMENT | 1.1.0 | 03/24/2017 | SERVICE D | DOCUMENT MANAGEMENT |
| 1067 | xxx1-6.doc | SERVICE D\DOCUMENT MANAGEMENT | FUNCTION A | SPECIFICATION DOCUMENT | 1.1.0 | 04/02/2017 | SERVICE D | DOCUMENT MANAGEMENT |
| 1068 | xxx1-7.doc | SERVICE D\DOCUMENT MANAGEMENT | FUNCTION A | SPECIFICATION DOCUMENT | 1.1.0 | 04/11/2017 | SERVICE D | DOCUMENT MANAGEMENT |
| 1069 | xxx1-8.doc | SERVICE D\DOCUMENT MANAGEMENT | FUNCTION A | DESIGN DESCRIPTION | 1.1.0 | 04/20/2017 | SERVICE D | DOCUMENT MANAGEMENT |
| 1070 | xxx1-9.doc | SERVICE D\DOCUMENT MANAGEMENT | FUNCTION A | DESIGN DESCRIPTION | 1.1.0 | 04/29/2017 | SERVICE D | DOCUMENT MANAGEMENT |
| 1071 | xxx1-10.doc | SERVICE D\DOCUMENT MANAGEMENT | FUNCTION A | DESIGN DESCRIPTION | 2.0.0 | 10/11/2017 | SERVICE D | DOCUMENT MANAGEMENT |
| 1072 | xxx1-11.doc | SERVICE D\DOCUMENT MANAGEMENT | FUNCTION A | DESIGN DESCRIPTION | 2.0.0 | 10/12/2017 | SERVICE D | DOCUMENT MANAGEMENT |
| 1073 | xxx1-12.doc | SERVICE D\DOCUMENT MANAGEMENT | FUNCTION A | DESIGN DESCRIPTION | 2.0.0 | 10/13/2017 | SERVICE D | DOCUMENT MANAGEMENT |
| 1074 | xxx1-13.doc | SERVICE D\DOCUMENT MANAGEMENT | FUNCTION A | DESIGN DESCRIPTION | 2.0.0 | 10/14/2017 | SERVICE D | DOCUMENT MANAGEMENT |
| 1075 | xxx1-14.doc | SERVICE D\DOCUMENT MANAGEMENT | FUNCTION A | DESIGN DESCRIPTION | 2.0.0 | 10/15/2017 | SERVICE D | DOCUMENT MANAGEMENT |
| 1076 | xxx1-15.doc | SERVICE D\DOCUMENT MANAGEMENT | FUNCTION B | SPECIFICATION DOCUMENT | 2.0.0 | 10/16/2017 | SERVICE D | DOCUMENT MANAGEMENT |
| 1077 | xxx1-16.doc | SERVICE D\DOCUMENT MANAGEMENT | FUNCTION B | DESIGN DESCRIPTION | 2.0.0 | 10/17/2017 | SERVICE D | DOCUMENT MANAGEMENT |
| 1078 | xxx1-17.doc | SERVICE D\DOCUMENT MANAGEMENT | FUNCTION B | DESIGN DESCRIPTION | 2.0.0 | 10/18/2017 | SERVICE D | DOCUMENT MANAGEMENT |
| 1079 | xxx1-18.doc | SERVICE D\DOCUMENT MANAGEMENT | FUNCTION B | DESIGN DESCRIPTION | 2.0.0 | 10/19/2017 | SERVICE D | DOCUMENT MANAGEMENT |
| 1080 | xxx1-19.doc | SERVICE D\DOCUMENT MANAGEMENT | FUNCTION B | DESIGN DESCRIPTION | 2.0.0 | 10/19/2017 | SERVICE D | DOCUMENT MANAGEMENT |
| 1081 | x2-101.doc | SERVICE D\SERVICE MANAGEMENT | MENU-1 | <NONE> | 1.1.0 | 04/11/2015 | SERVICE D | SERVICE MANAGEMENT |
| 1082 | x2-102.doc | SERVICE D\SERVICE MANAGEMENT | MENU-1 | <NONE> | 1.1.0 | 04/12/2015 | SERVICE D | SERVICE MANAGEMENT |
| 1083 | x2-103.doc | SERVICE D\SERVICE MANAGEMENT | MENU-1 | <NONE> | 1.1.0 | 04/13/2015 | SERVICE D | SERVICE MANAGEMENT |
| 1084 | x2-104.doc | SERVICE D\SERVICE MANAGEMENT | MENU-1 | <NONE> | 1.1.0 | 04/14/2015 | SERVICE D | SERVICE MANAGEMENT |
| 1085 | x2-105.doc | SERVICE D\SERVICE MANAGEMENT | MENU-1 | <NONE> | 1.1.0 | 04/15/2015 | SERVICE D | SERVICE MANAGEMENT |
| 1086 | x2-106.doc | SERVICE D\SERVICE MANAGEMENT | MENU-1 | <NONE> | 1.1.0 | 04/16/2015 | SERVICE D | SERVICE MANAGEMENT |
| 1087 | x2-107.doc | SERVICE D\SERVICE MANAGEMENT | MENU-1 | <NONE> | 1.1.0 | 04/17/2015 | SERVICE D | SERVICE MANAGEMENT |
| 1088 | x2-108.doc | SERVICE D\SERVICE MANAGEMENT | MENU-1 | <NONE> | 1.1.0 | 04/18/2015 | SERVICE D | SERVICE MANAGEMENT |
| 1089 | x2-109.doc | SERVICE D\SERVICE MANAGEMENT | MENU-1 | <NONE> | 2.0.0 | 04/11/2016 | SERVICE D | SERVICE MANAGEMENT |
| 1090 | x2-110.doc | SERVICE D\SERVICE MANAGEMENT | MENU-1 | <NONE> | 2.0.0 | 04/12/2016 | SERVICE D | SERVICE MANAGEMENT |
| 1091 | x2-111.doc | SERVICE D\SERVICE MANAGEMENT | MENU-1 | <NONE> | 2.0.0 | 04/13/2016 | SERVICE D | SERVICE MANAGEMENT |
| 1092 | x2-112.doc | SERVICE D\SERVICE MANAGEMENT | MENU-1 | <NONE> | 2.0.0 | 04/14/2016 | SERVICE D | SERVICE MANAGEMENT |
| 1093 | x2-113.doc | SERVICE D\SERVICE MANAGEMENT | MENU-1 | <NONE> | 2.0.0 | 04/15/2016 | SERVICE D | SERVICE MANAGEMENT |
| 1094 | x2-114.doc | SERVICE D\SERVICE MANAGEMENT | MENU-1 | <NONE> | 2.0.0 | 04/16/2016 | SERVICE D | SERVICE MANAGEMENT |
| 1095 | x2-115.doc | SERVICE D\SERVICE MANAGEMENT | MENU-2 | <NONE> | 2.0.0 | 04/17/2016 | SERVICE D | SERVICE MANAGEMENT |
| 1096 | x2-116.doc | SERVICE D\SERVICE MANAGEMENT | MENU-2 | <NONE> | 2.0.0 | 04/18/2016 | SERVICE D | SERVICE MANAGEMENT |
| 1097 | x2-117.doc | SERVICE D\SERVICE MANAGEMENT | MENU-2 | <NONE> | 2.0.0 | 04/19/2016 | SERVICE D | SERVICE MANAGEMENT |
| 1098 | x2-118.doc | SERVICE D\SERVICE MANAGEMENT | MENU-2 | <NONE> | 2.0.0 | 04/20/2016 | SERVICE D | SERVICE MANAGEMENT |
| 1099 | x2-119.doc | SERVICE D\SERVICE MANAGEMENT | MENU-2 | <NONE> | 2.0.0 | 04/21/2016 | SERVICE D | SERVICE MANAGEMENT |
| 1100 | x2-120.doc | SERVICE D\SERVICE MANAGEMENT | MENU-2 | <NONE> | 2.0.0 | 04/22/2016 | SERVICE D | SERVICE MANAGEMENT |
| 1101 | x2-121.doc | SERVICE D\SERVICE MANAGEMENT | MENU-2 | <NONE> | 2.0.0 | 04/23/2016 | SERVICE D | SERVICE MANAGEMENT |
| 1102 | x2-122.doc | SERVICE D\SERVICE MANAGEMENT | MENU-2 | <NONE> | 2.0.0 | 04/24/2016 | SERVICE D | SERVICE MANAGEMENT |
| 1103 | x2-123.doc | SERVICE D\SERVICE MANAGEMENT | MENU-2 | <NONE> | 2.0.0 | 04/25/2016 | SERVICE D | SERVICE MANAGEMENT |
| 1104 | x2-124.doc | SERVICE D\SERVICE MANAGEMENT | MENU-2 | <NONE> | 2.0.0 | 04/26/2016 | SERVICE D | SERVICE MANAGEMENT |
| 1105 | x2-125.doc | SERVICE D\SERVICE MANAGEMENT | MENU-2 | <NONE> | 2.0.0 | 04/27/2016 | SERVICE D | SERVICE MANAGEMENT |
| 1106 | x2-126.doc | SERVICE D\SERVICE MANAGEMENT | MENU-2 | <NONE> | 2.0.0 | 04/28/2016 | SERVICE D | SERVICE MANAGEMENT |
| 1107 | x2-127.doc | SERVICE D\SERVICE MANAGEMENT | MENU-2 | <NONE> | 2.0.0 | 04/29/2016 | SERVICE D | SERVICE MANAGEMENT |
| 1108 | x2-128.doc | SERVICE D\SERVICE MANAGEMENT | MENU-2 | <NONE> | 2.0.0 | 04/30/2016 | SERVICE D | SERVICE MANAGEMENT |
| 1109 | x2-129.doc | SERVICE D\SERVICE MANAGEMENT | MENU-2 | <NONE> | 2.0.0 | 05/01/2016 | SERVICE D | SERVICE MANAGEMENT |
| 1110 | x2-130.doc | SERVICE D\SERVICE MANAGEMENT | MENU-2 | <NONE> | 2.0.0 | 05/02/2016 | SERVICE D | SERVICE MANAGEMENT |
| 1111 | x2-131.doc | SERVICE D\SERVICE MANAGEMENT | MENU-2 | <NONE> | 2.0.0 | 05/03/2016 | SERVICE D | SERVICE MANAGEMENT |
| 1112 | x2-132.doc | SERVICE D\SERVICE MANAGEMENT | MENU-2 | <NONE> | 2.0.0 | 05/04/2016 | SERVICE D | SERVICE MANAGEMENT |
| 1113 | x2-133.doc | SERVICE D\SERVICE MANAGEMENT | MENU-2 | <NONE> | 2.0.0 | 05/05/2016 | SERVICE D | SERVICE MANAGEMENT |
| 1114 | x2-134.doc | SERVICE D\SERVICE MANAGEMENT | MENU-2 | <NONE> | 2.0.0 | 05/06/2016 | SERVICE D | SERVICE MANAGEMENT |

FIG. 11

| ITEM | NUMBER OF CLASSIFICATIONS | NOTE |
|---|---|---|
| ID | 114 | |
| FILE NAME | 106 | |
| CLASS | 8 | |
| FUNCTION | 13 | |
| DOCUMENT TYPE | 4 | |
| VERSION | 4 | |
| UPDATE DATE | 97 | |
| UPDATE DATE (YEAR/MONTH) | 14 | "ADDITION" COUNT DUPLICATION IN UNIT OF MONTH. |
| CLASS 1 | 5 | |
| CLASS 2 | 6 | |

FIG. 12A

| DOCUMENT TYPE | NUMBER OF PIECES |
|---|---|
| <NONE> | 40 |
| TEST DESIGN DESCRIPTION | 2 |
| SPECIFICATION DOCUMENT | 54 |
| DESIGN DESCRIPTION | 18 |

FIG. 12B

| VERSION | NUMBER OF PIECES |
|---|---|
| 1.0.0 | 29 |
| 1.1.0 | 44 |
| 2.0.0 | 40 |
| <NONE> | 1 |

FIG. 13A

| DOCUMENT TYPE-VERSION ▼ | NUMBER OF PIECES ▼ |
|---|---:|
| <NONE> | 40 |
| 1.0.0 | 14 |
| 2.0.0 | 26 |
| TEST DESIGN DESCRIPTION | 2 |
| 1.1.0 | 1 |
| 2.0.0 | 1 |
| SPECIFICATION DOCUMENT | 54 |
| <NONE> | 1 |
| 1.0.0 | 25 |
| 1.1.0 | 24 |
| 2.0.0 | 4 |
| DESIGN DESCRIPTION | 18 |
| 1.0.0 | 2 |
| 1.1.0 | 7 |
| 2.0.0 | 9 |

FIG. 13B

| VERSION-DOCUMENT TYPE | NUMBER OF PIECES |
|---|---:|
| 1.0.0 | 29 |
| <NONE> | 2 |
| SPECIFICATION DOCUMENT | 25 |
| DESIGN DESCRIPTION | 2 |
| 1.1.0 | 44 |
| <NONE> | 12 |
| TEST DESIGN DESCRIPTION | 1 |
| SPECIFICATION DOCUMENT | 24 |
| DESIGN DESCRIPTION | 7 |
| 2.0.0 | 40 |
| <NONE> | 26 |
| TEST DESIGN DESCRIPTION | 1 |
| SPECIFICATION DOCUMENT | 4 |
| DESIGN DESCRIPTION | 9 |
| <NONE> | 1 |
| SPECIFICATION DOCUMENT | 1 |

FIG. 14

| DOCUMENT TYPE-VERSION-CLASS 1 | NUMBER OF PIECES |
|---|---|
| <NONE> | 40 |
|   1.0.0 | 2 |
|     SERVICE A | 2 |
|   1.1.0 | 12 |
|     SERVICE C | 4 |
|     SERVICE D | 8 |
|   2.0.0 | 26 |
|     SERVICE D | 26 |
| TEST DESIGN DESCRIPTION | 2 |
|   1.1.0 | 1 |
|     SW PRODUCT | 1 |
|   2.0.0 | 1 |
|     SW PRODUCT | 1 |
| SPECIFICATION DOCUMENT | 54 |
|   1.0.0 | 25 |
|     SW PRODUCT | 15 |
|     SERVICE 1.0 | 10 |
|   1.1.0 | 24 |
|     SW PRODUCT | 9 |
|     SERVICE C | 8 |
|     SERVICE D | 7 |
|   2.0.0 | 4 |
|     SW PRODUCT | 3 |
|     SERVICE D | 1 |
|   <NONE> | 1 |
|     SERVICE 1.0 | 1 |
| DESIGN DESCRIPTION | 18 |
|   1.0.0 | 2 |
|     SERVICE 1.0 | 2 |
|   1.1.0 | 7 |
|     SW PRODUCT | 1 |
|     SERVICE C | 4 |
|     SERVICE D | 2 |
|   2.0.0 | 9 |
|     SERVICE D | 9 |

FIG. 15

| VERSION-DOCUMENT TYPE-CLASS 1 | NUMBER OF PIECES |
|---|---|
| 1.0.0 | 29 |
|   <NONE> | 2 |
|     SERVICE A | 2 |
|   SPECIFICATION DOCUMENT | 25 |
|     SW PRODUCT | 15 |
|     SERVICE 1.0 | 10 |
|   DESIGN DESCRIPTION | 2 |
|     SERVICE 1.0 | 2 |
| 1.1.0 | 44 |
|   <NONE> | 12 |
|     SERVICE C | 4 |
|     SERVICE D | 8 |
|   TEST DESIGN DESCRIPTION | 1 |
|     SW PRODUCT | 1 |
|   SPECIFICATION DOCUMENT | 24 |
|     SW PRODUCT | 9 |
|     SERVICE C | 8 |
|     SERVICE D | 7 |
|   DESIGN DESCRIPTION | 7 |
|     SW PRODUCT | 1 |
|     SERVICE C | 4 |
|     SERVICE D | 2 |
| 2.0.0 | 40 |
|   <NONE> | 26 |
|     SERVICE D | 26 |
|   TEST DESIGN DESCRIPTION | 1 |
|     SW PRODUCT | 1 |
|   SPECIFICATION DOCUMENT | 4 |
|     SW PRODUCT | 3 |
|     SERVICE D | 1 |
|   DESIGN DESCRIPTION | 9 |
|     SERVICE D | 9 |
| <NONE> | 1 |
|   SPECIFICATION DOCUMENT | 1 |
|     SERVICE 1.0 | 1 |

FIG. 16

| ITEM ▼ | PRIORITY ▼ | NOTE ▼ |
|---|---|---|
| ID | | |
| FILE NAME | | |
| CLASS | | |
| FUNCTION | | |
| DOCUMENT TYPE | 1 | |
| VERSION | 2 | |
| UPDATE DATE | | |
| UPDATE DATE (YY/MM) | | |
| CLASS 1 | | |
| CLASS 2 | | |

FIG. 17

| DOCUMENT TYPE-VERSION-CLASS 1-CLASS 2 | NUMBER OF PIECES |
|---|---|
| <NONE> | 40 |
|   1.0.0 | 2 |
|     SERVICE A | |
|       1.0 | 2 |
|   1.1.0 | 12 |
|     SERVICE C | |
|       <NONE> | 4 |
|     SERVICE D | |
|       SERVICE MANAGEMENT | 8 |
|   2.0.0 | 26 |
|     SERVICE D | |
|       SERVICE MANAGEMENT | 26 |
| TEST DESIGN DESCRIPTION | 2 |
|   1.1.0 | 1 |
|     SW PRODUCT | |
|       1.1 | 1 |
|   2.0.0 | 1 |
|     SW PRODUCT | |
|       2.0 | 1 |
| SPECIFICATION DOCUMENT | 54 |
|   1.0.0 | 25 |
|     SW PRODUCT | |
|       1.0 | 14 |
|       2.0 | 1 |
|     SERVICE 1.0 | |
|       1.0 | 10 |
|   1.1.0 | 24 |
|     SW PRODUCT | |
|       1.1 | 9 |
|     SERVICE C | |
|       <NONE> | 8 |
|     SERVICE D | |
|       DOCUMENT MANAGEMENT | 7 |
|   2.0.0 | 4 |
|     SW PRODUCT | |
|       2.0 | 3 |
|     SERVICE D | |
|       DOCUMENT MANAGEMENT | 1 |
|   <NONE> | 1 |
|     SERVICE 1.0 | |
|       <NONE> | 1 |
| DESIGN DESCRIPTION | 18 |
|   1.0.0 | 2 |
|     SERVICE 1.0 | |
|       1.0 | 2 |
|   1.1.0 | 7 |
|     SW PRODUCT | |
|       1.1 | 1 |
|     SERVICE C | |
|       <NONE> | 4 |
|     SERVICE D | |
|       DOCUMENT MANAGEMENT | 2 |
|   2.0.0 | 9 |
|     SERVICE D | |
|       DOCUMENT MANAGEMENT | 9 |

INFORMATION PROCESSING APPARATUS, INFORMATION PROCESSING SYSTEM, AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2018-126363 filed Jul. 2, 2018.

BACKGROUND

(i) Technical Field

The present invention relates to an information processing apparatus, an information processing system, and a non-transitory computer readable medium storing an information processing program.

(ii) Related Art

In JP2009-123022A, a document management apparatus that converts management of a document managed by a folder tree to management in a search folder is proposed. In detail, the document management apparatus newly defines attributes of a document included in each class of the folder tree as a conversion source, and assigns a name of a folder which is at a higher class and stores a document to each document belonging to the folder tree, as an attribute value of the defined attribute. Each folder constituting the folder tree is converted into a search folder in which searching for a document to which the attribute value has been assigned is possible using the name of the folder as a search condition.

In JP0551248B, a file management apparatus that classifies and manages plural physical files is proposed. In detail, the file management apparatus includes a processor that executes a program of generating a virtual folder for classifying plural physical files and a storage device that stores metadata management information for managing metadata of the plural physical files. The virtual folder of the file management apparatus is a virtual folder which has no relationship with places in which plural physical files or plural physical folder storing the plural physical files are provided, and is used for managing link information between the plural physical files and the physical folders. The processor extracts plural keywords from text strings constituting metadata of plural files in the metadata management information, and acquires information of a frequency of each of the extracted keywords. The processor generates virtual higher folders of which the number is a defined value, by using the keyword of which the frequency is equal to or more than a predetermined value. The processor generates a virtual lower folder associated with the virtual higher folder by using other keywords including the keyword which has been used for the virtual higher folder. Then, the processor outputs a virtual classification display of displaying a relationship between the virtual higher folder and the virtual lower folder which have been generated, and contents of the virtual higher folder and the virtual lower folder.

In JP2011-095997A, an information processing apparatus that registers data on a folder and a document managed in a first document management system, in a second document management system is proposed. In detail, the information processing apparatus sequentially sets a folder managed in the first document management system, as a registration target folder, and determines whether or not the registration target folder is within a depth limit value in a folder hierarchy. In a case where the registration target folder is within the depth limit value, the information processing apparatus registers the registration target folder in a position in a folder hierarchy of the second document management system, which corresponds to the folder class when the target folder is managed in the first document management system. In a case where the registration target folder exceeds the depth limit value, the information processing apparatus registers the registration target folder in a shallow class in the folder hierarchy in the second document management system.

SUMMARY

In a case where an attempt to transfer information into another system is performed, the transfer may not be possible in a case where the number of elements (for example, folders or files) capable of being stored in a system as a transfer destination is limited. Aspects of non-limiting embodiments of the present disclosure relate to an information processing apparatus, an information processing system, and a non-transitory computer readable medium storing an information processing program, in which transfer of information in a transfer source into a transfer destination is possible even in a case where the information in the transfer source does not meet the limit in the transfer destination.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus which includes an acquisition unit that acquires source information of a transfer source, which includes a plurality of elements to which attribute information has been assigned, and limit information indicating the number of elements storable in a transfer destination, and a generation unit that classifies the elements by using the attribute information of each of the elements in the source information and generates a hierarchical structure of the source information by using a unit of a classification as a unit of a class, so as to correspond to the number of elements indicated by the limit information in the transfer destination.

BRIEF DESCRIPTION OF THE DRAWINGS

Exemplary embodiment(s) of the present invention will be described in detail based on the following figures, wherein:

FIG. 4 is a flowchart illustrating an example of a flow of specific processes of the data transferring processing performed by a transferring processing performing unit in the information processing system according to the exemplary embodiment;

FIG. 5 is a diagram illustrating an example of items of data in the transfer source;

FIG. 6 is a diagram illustrating an example (first page) of transfer-source export data;

FIG. 7 is a diagram illustrating another example (second page) of the transfer-source export data;

FIG. 8 is a diagram illustrating an example of limit information in the transfer source and the transfer destination;

FIG. 9 is a diagram illustrating an example (first page) in which Class 1 and Class 2 have been assigned to the transfer-source export data, as attribute information;

FIG. 10 is a diagram illustrating another example (second page) in which Class 1 and Class 2 have been assigned to the transfer-source export data, as the attribute information;

FIG. 11 is a diagram illustrating a result obtained by an export determination function extracting the number of classifications of the attribute information;

FIG. 12A is a diagram illustrating a result obtained by listing up the number of pieces of attribute information of a document type;

FIG. 12B is a diagram illustrating a result obtained by listing up the number of pieces of attribute information of a version;

FIG. 13A is a diagram illustrating a result obtained by listing up the number of pieces of attribute information of the version after a class of the document type is created;

FIG. 13B is a diagram illustrating a result obtained by listing up the number of pieces of attribute information of the document type after a class of the version is created;

FIG. 14 is a diagram illustrating a result obtained by listing up the number of pieces of attribute information of Class 1 after the class of the version has been created under the class of the document type;

FIG. 15 is a diagram illustrating a result obtained by listing up the number of pieces of attribute information of Class 1 after the class of the document type has been created under the class of the version;

FIG. 16 is a diagram illustrating a setting example of a priority by an attribute priority setting function;

FIG. 17 is a diagram illustrating an example of a result obtained by creating the class of the document type prior to the version.

DETAILED DESCRIPTION

Figure 1:
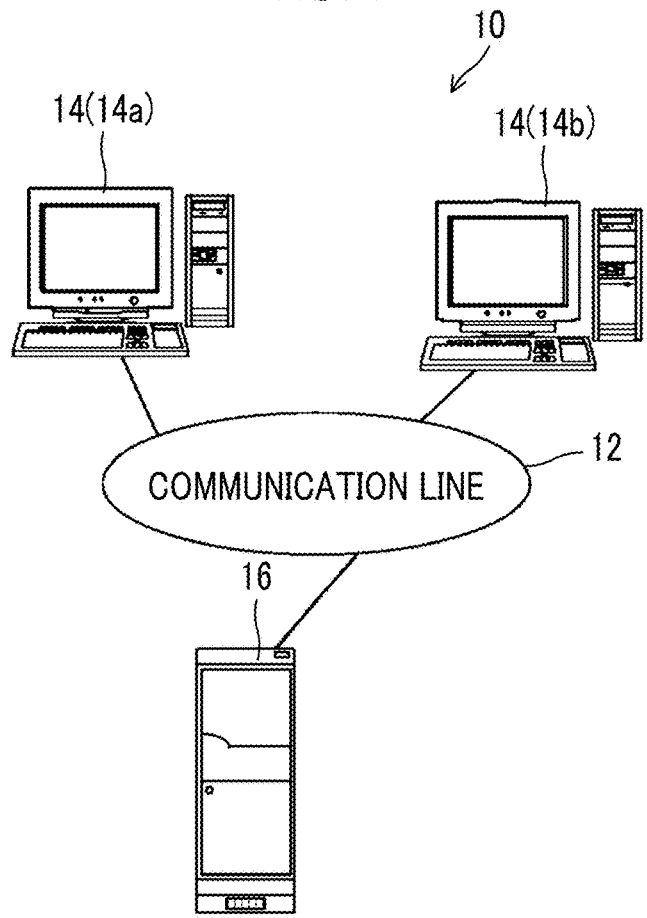
FIG. 1 is a schematic diagram illustrating a configuration of an information processing system according to an exemplary embodiment.

Hereinafter, an example of an exemplary embodiment will be described in detail with reference to the drawings. In the exemplary embodiment, an information processing system in which plural information processing apparatuses and a server are connected to each other via a communication line, for example, various networks will be described as an example. FIG. 1 is a schematic diagram illustrating a configuration of an information processing system 10 according to the exemplary embodiment.

As illustrated in FIG. 1, the information processing system 10 according to the exemplary embodiment includes plural information processing apparatuses 14a, 14b, and . . . , and a cloud server 16. In a case where describing the information processing apparatuses 14a, 14b, and . . . with distinguishing the apparatuses 14a, 14b, and . . . from each other is not required, the descriptions may be made in a state where the alphabet at the end of the reference sign is omitted. In the exemplary embodiment, an example in which the plural information processing apparatuses 14a, 14b, and . . . are provided will be described. However, one information processing apparatus 14 may be provided.

Each of the information processing apparatuses 14 and the cloud server 16 are connected to each other via a communication line 12 such as a local area network (LAN), a wide area network (WAN), the Internet, and an intranet. The information processing apparatuses 14 and the cloud server may transmit and receive various kinds of data to and from each other via the communication line 12.

In the information processing system 10 according to the exemplary embodiment, the cloud server 16 provides a document management service of managing a document, as a cloud service. For example, in the document management service, the information processing apparatus 14 accesses the cloud server 16, and thereby storing various documents as information in the cloud server 16 or display of a document as a management target, which has been stored in the cloud server 16 is allowed.

Figure 2:
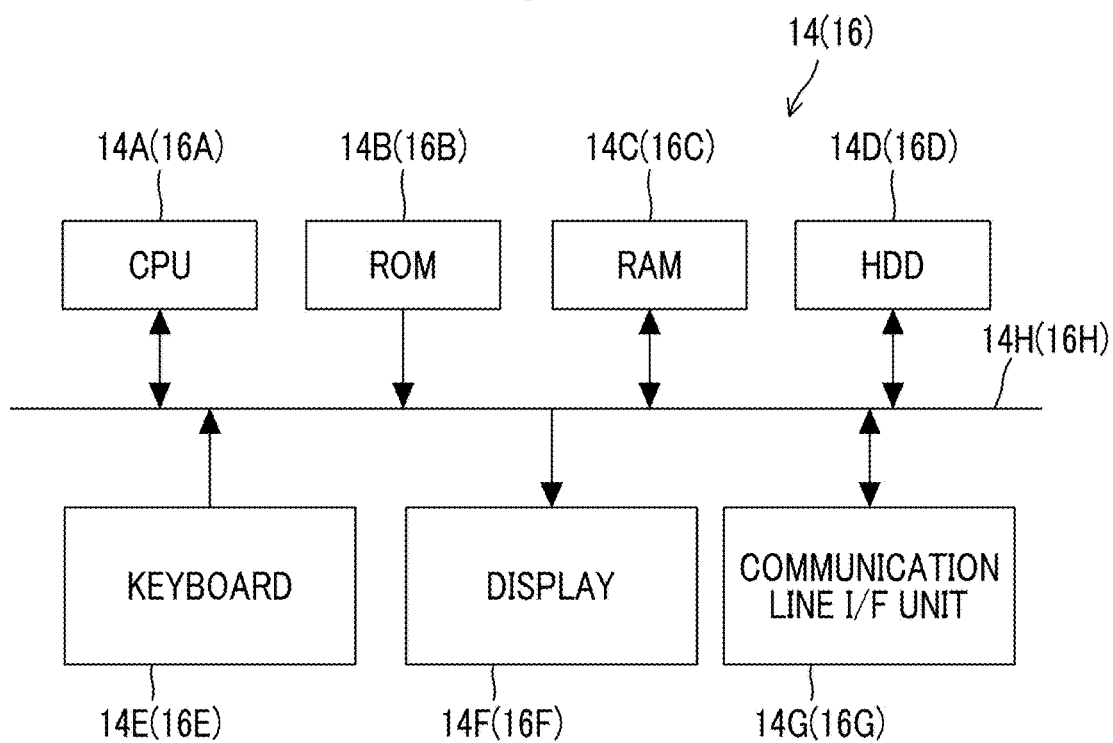
FIG. 2 is a block diagram illustrating a main configuration of an electrical system of an information processing apparatus and a cloud server in the information processing system according to the exemplary embodiment.

Next, the main configuration of an electrical system of the information processing apparatus 14 and the cloud server 16 according to the exemplary embodiment will be described. FIG. 2 is a block diagram illustrating the main configuration of the electrical system of the information processing apparatus 14 and the cloud server 16 in the information processing system 10 according to the exemplary embodiment. Basically, the information processing apparatus 14 and the cloud server 16 have a configuration of a general computer. Thus, the information processing apparatus 14 as the representative will be described.

As illustrated in FIG. 2, the information processing apparatus 14 according to the exemplary embodiment includes a CPU 14A, a ROM 14B, a RAM 14C, an HDD 14D, a keyboard 14E, a display 14F, and a communication line IF (interface) unit 14G. The CPU 14A controls the overall operation of the information processing apparatus 14. The ROM 14B stores various control programs, various parameter, and the like in advance. The RAM 14C is used as a work area or the like in a case where the CPU 14A executes various programs. The HDD 14D stores various kinds of data, various application programs, and the like. The keyboard 14E is used for inputting various kinds of information. The display 14F is used for displaying various kinds of information. The communication line IF unit 14G is connected to the communication line 12 so as to transmit and receive various kinds of data to and from other apparatuses connected to the communication line 12. The above-described units of the information processing apparatus 14 are electrically connected to each other by a system bus 14H. In the information processing apparatus 14 according to the exemplary embodiment, the HDD 14D is applied as a storage unit. However, it is not limited thereto, and other nonvolatile storage units such as flash memories may be applied.

With the above configuration, in the information processing apparatus 14 according to the exemplary embodiment, the CPU 14A accesses the ROM 14B, the RAM 14C, and the HDD 14D, acquires various kinds of data through the keyboard 14E, or displays various kinds of information in the display 14F. In the information processing apparatus 14, the CPU 14A controls transmission and reception of communication data through the communication line IF unit 14G.

As described above, in the information processing system 10 according to the exemplary embodiment, which has such a configuration, the cloud server 16 provides the document management service of managing a document, as the cloud service. For example, information stored in the information processing apparatus 14 is transferred into the cloud server 16, as a document of a management target, and thus a document is managed by the cloud server 16.

In a case where a document in a transfer source is transferred, the number of elements storable in a system as a transfer destination may be limited as a limit in the transfer destination. For example, the number of elements (for example, folders and files) included in a folder may be limited. The number of elements included in a folder is not limited in a local environment in the information processing apparatus 14 or the like. In a case where elements of which the number exceeds the limit value in a transfer destination are included in a folder in the information processing apparatus 14, and an attempt of transfer into the cloud server 16 is performed, the transfer is not possible because the number of elements exceeds the limit value.

In the exemplary embodiment, in a case where the number of elements in a transfer source does not meet the limit in a transfer destination, data transferring processing of transferring information so as to match with the limit in the transfer destination is performed. The data transferring processing is performed by any of the information processing apparatus 14 as a transfer source, the cloud server 16 as a transfer destination, and other information processing apparatuses connected to the communication line 12.

Figure 3:
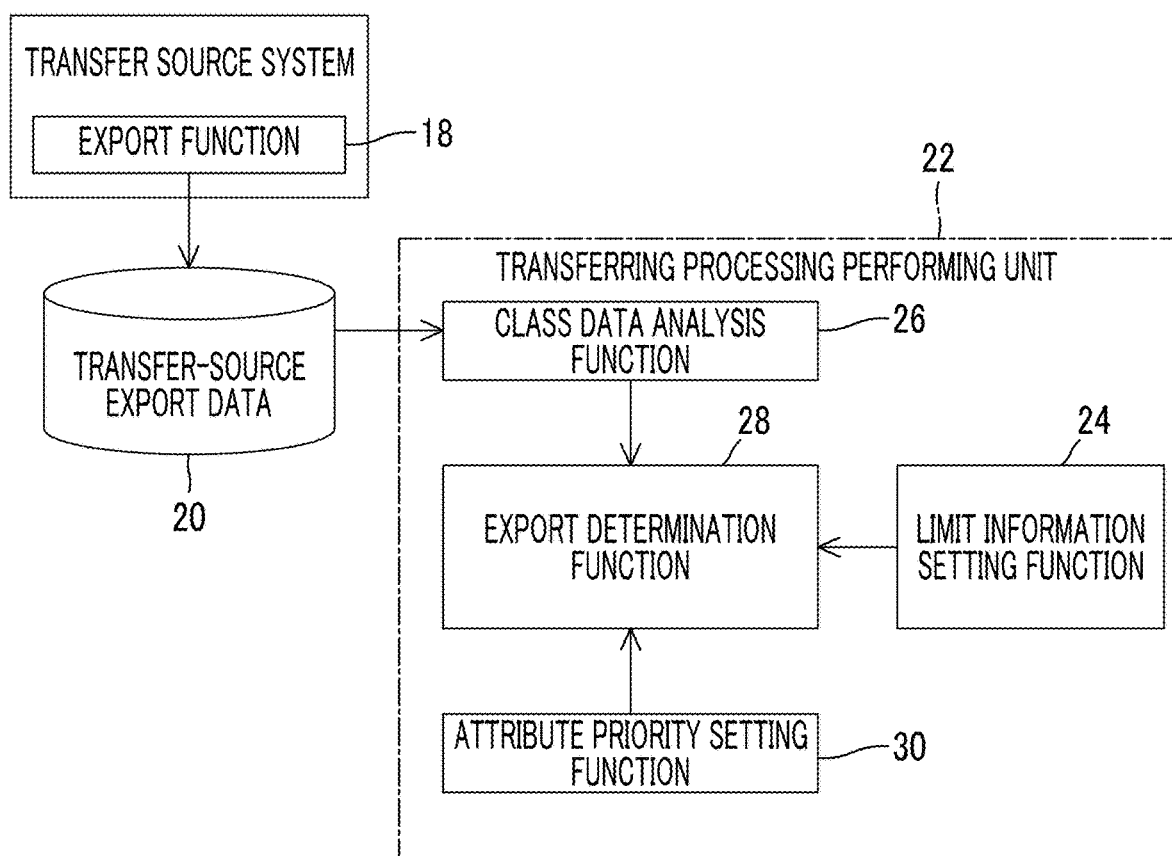
FIG. 3 is a functional block diagram illustrating a transferring processing performing function provided in any of an information processing apparatus as a transfer source, a cloud server as a transfer destination, and other information processing apparatuses connected to a communication line, in a case where the information processing apparatus, the cloud server, or the other information processing apparatuses perform data transferring processing.

Details of the data transferring processing will be described. FIG. 3 is a functional block diagram illustrating a transferring processing performing function provided in any of the information processing apparatus 14 as the transfer source, the cloud server 16 as the transfer destination, and other information processing apparatuses connected to the communication line 12 in a case where the information processing apparatus 14, the cloud server 16, or the other information processing apparatuses perform the data transferring processing.

The data transferring processing is performed by the transferring processing performing unit 22. That is, the information processing apparatus 14 as the transfer source, the cloud server 16 as the transfer destination, or other information processing apparatuses connected to the communication line 12 function as the transferring processing performing unit 22.

As illustrated in FIG. 3, the transferring processing performing unit 22 includes a limit information setting function 24, a class data analysis function 26, an export determination function 28, and an attribute priority setting function 30. The class data analysis function 26 and the export determination function 28 corresponds to an acquisition unit. The export determination function 28 corresponds to a generation unit. The attribute priority setting function 30 corresponds to a setting unit.

The limit information setting function 24 sets limit information in each system of a transfer source and a transfer destination. In the exemplary embodiment, the number of elements in the identical class in each system of the transfer source and the transfer destination is set. Setting the limit information by the limit information setting function 24 may be performed by a user operating in accordance with an input screen. Alternatively, setting may be performed by acquiring the limit information from both the systems.

The class data analysis function 26 analyzes transfer-source export data 20 and extracts attribute information from the transfer-source export data 20 for each class. For example, the number of options in a document management system of a data transfer destination increases by determining whether the identical attribute is not provided. The class data analysis function 26 assigns a class in the transfer-source export data 20, as attribute information. The transfer-source export data 20 is acquired from a transfer source system. Specifically, an export function in the transfer source system causes information as a transfer target to be output as the transfer-source export data 20, by exporting information in the transfer source. For example, in a case where information is transferred from the information processing apparatus 14 into the cloud server 16, the information processing apparatus 14 outputs information of the transfer target, as the transfer-source export data 20.

The export determination function 28 classifies elements in the transfer-source export data 20, to which classes as the attribute information have been assigned by analysis of the class data analysis function 26, by using the attribute information. Then, the export determination function 28 extracts the number of classifications of the attribute information. Classes are created in an order from attribute information in which the number of classifications is small. Classes are created until the number of created classes reaches the limit set by the limit information setting function 24. That is, classes are sequentially created on the assumption that attribute information in which the number of classifications is the smallest is set as the first class and attribute information in which the number of classifications is the next smallest is set as the second class. The class is created until the number of elements reaches the value set by the limit information setting function 24.

The attribute priority setting function 30 sets a priority of the attribute information in a case where the export determination function 28 generate the class. That is, a priority order used in a document management system of a transfer destination is changed by setting the priority. Thus, the document management system desired by the user is realized. The attribute priority setting function 30 may further include a receiving unit that receives the priority order used in a case where the attribute information is classified. For example, setting of the priority by the attribute priority setting function 30 may be performed in a manner that the user operates an operation unit (keyboard 14E or 16E, and the like), as the receiving unit, of an apparatus in which the transferring processing performing unit 22 has been provided in accordance with the input screen. Alternatively, a predetermined priority may be acquired from a system of a transfer source or the information processing apparatus 14 connected to the communication line 12.

Next, specific processes of the data transferring processing performed in the information processing system 10 according to the exemplary embodiment, which has been configured as described above will be described. FIG. 4 is a flowchart illustrating an example of a flow of the specific processes of the data transferring processing performed by the transferring processing performing unit 22 in the information processing system 10 according to the exemplary embodiment. It is assumed that the processes in FIG. 4 are performed by any of the information processing apparatus 14 as a transfer source, the cloud server 16 as a transfer destination, and other information processing apparatuses connected to the communication line 12.

In Step 100, the class data analysis function 26 acquires transfer-source export data 20 exported by the export function 18 in the transfer source and causes the process to proceed to Step 102.

In Step 102, the export determination function 28 acquires the number of elements in the identical class, as limit information of the transfer destination and the transfer source, which has been set by the limit information setting function 24. Then, the process proceeds to Step 104.

In Step 104, the class data analysis function 26 assigns a class in the transfer-source export data 20, as attribute information. Then, the process proceeds to Step 106.

In Step 106, the export determination function 28 classifies the transfer-source export data 20 to which the class has been assigned as the attribute information by the analysis of the class data analysis function 26, by using the attribute information. The export determination function 28 extracts the number of attribute classifications and causes the process to proceed to Step 108.

In Step 108, the export determination function 28 determines whether or not the priority of the attribute information in a case where the export determination function 28 generates a class has been set. Regarding the determination, the export determination function 28 determines whether or not the priority of the attribute information, which is used in a case where the export determination function 28 generates a class has been set by the attribute priority setting function 30. In a case where it is determined that the priority has been not set, the process proceeds to Step 110. In a case where it is determined that the priority has been set, the process proceeds to Step 112.

In Step 110, the export determination function 28 generates a class based on the number of classifications of the attribute information, which has been analyzed by the class data analysis function 26. Then, a series of data conversion processing ends. That is, the export determination function 28 sequentially creates classes on the assumption that attribute information in which the number of classifications is the smallest is set as the first class and attribute information in which the number of classifications is the next smallest is set as the second class. The export determination function 28 creates a class until the number of elements reaches the value set by the limit information setting function 24.

In Step 112, the export determination function 28 generates a class in accordance with the priority set by the attribute priority setting function 30, and ends a series of processing. That is, the export determination function 28 creates classes in accordance with the priority of the attribute information, which has been set. The export determination function 28 sequentially creates classes on the assumption that attribute information in which the number of classifications is the smallest is set as the first class and attribute information in which the number of classifications is the next smallest is set as the second class. The export determination function 28 creates a class until the number of elements reaches the value set by the limit information setting function 24.

Next, a specific example of the data transferring processing performed by the above-described transferring processing performing unit 22 will be described. Descriptions will be made by using an example in which data in a transfer source is a condition illustrated in FIG. 5. FIG. 5 is a diagram illustrating an example of items of data in the transfer source. FIG. 6 is a diagram illustrating an example (first page) of transfer-source export data 20. FIG. 7 is a diagram illustrating another example (second page) of the transfer-source export data 20.

As illustrated in FIG. 5, the data in the transfer source has a file name, a class, a function, a document type, a version, and an update date as items. Specifically, as illustrated in FIGS. 6 and 7, the data has 114 files.

In the data transferring processing, the class data analysis function 26 acquires 114 files illustrated in FIGS. 6 and 7, as transfer-source export data 20.

Here, a case where the limit information setting function 24 sets limit information having contents illustrated in FIG. 8 will be described. That is, the system of a transfer source does not have a limit on the number of elements in the identical class, and the system of a transfer destination has a limit on the number of elements in the identical class, which is set to 20.

The class data analysis function 26 analyzes the transfer-source export data 20 and extracts attribute information from the transfer-source export data 20 for each class. The class data analysis function 26 assigns a class in the transfer-source export data 20, as attribute information. FIGS. 9 and 10 illustrate an example in which a class to which each file belongs is assigned as attribute information. Specifically, FIG. 9 is a diagram illustrating an example (first page) in which Class 1 and Class 2, as attribute information, are assigned to the transfer-source export data 20. FIG. 10 is a diagram illustrating another example (second page) in which Class 1 and Class 2, as attribute information, are assigned to the transfer-source export data 20.

The export determination function 28 classifies attribute information from the transfer-source export data 20 to which classes as attribute information have been assigned by the analysis of the class data analysis function 26, and extracts the number of classifications of the attribute information. FIG. 11 is a diagram illustrating a result obtained by the export determination function 28 extracting the number of classifications of the attribute information. That is, as illustrated in FIG. 11, as the number of classifications of the attribute information, 114 files (ID), 106 file names, 8 classes, 13 functions, 4 document types, 4 versions, 98 update dates, 14 update dates (year/month), 5 kinds of Class 1, and 6 kinds of Class 2 are provided.

Then, as described above, the export determination function 28 creates a class in an order from attribute information in which the number of classifications is the smallest, and creates classes until the number of created classes reaches the limit set by the limit information setting function 24. Specifically, as illustrated in FIGS. 12A and 12B, 4 document types and 4 versions are provided as the attribute information in which the number of classifications is the smallest. Thus, the number of pieces of attribute information for the 4 document types and the 4 versions are listed up. FIG. 12A is a diagram illustrating a result obtained by listing up the number of pieces of attribute information of each document type. FIG. 12B is a diagram illustrating a result obtained by listing up the number of pieces of attribute information of each version. As illustrated in FIGS. 12A and 12B, since 20 being the limit value is not satisfied, the number of pieces of attribute information, which is the next largest is listed up. FIG. 13A is a diagram illustrating a result obtained by listing up the number of pieces of attribute information for each version after the class of the document type has been created. FIG. 13B is a diagram illustrating a result obtained by listing up the number of pieces of attribute information for each document type after the class of the version has been created. As illustrated in FIGS. 13A and 13B, since 20 being the limit value is not satisfied yet, the number of pieces of attribute information, which is the next largest is listed up. FIG. 14 is a diagram illustrating a result obtained by listing up the number of pieces of attribute information for Class 1 after the class of the version has been created under the class of the document type. FIG. 15 is a diagram illustrating a result obtained by listing up the number of pieces of attribute information for Class 1 after the class of the document type has been created under the class of the version. The data conversion processing with matching with the limit in the transfer destination is performed by sequentially creating a class and creating classes in this manner until 20 being the limit value is satisfied.

FIG. 16 is a diagram illustrating a setting example of the priority by the attribute priority setting function 30. In a case where the export determination function 28 creates a class, the export determination function 28 creates a class preferentially for attribute information in accordance with the setting. In the example in FIG. 16, an example in which the document type has priority over the version is illustrated. FIG. 17 is a diagram illustrating an example of a result obtained by creating a class for the document type prior to the version.

Figure 18:
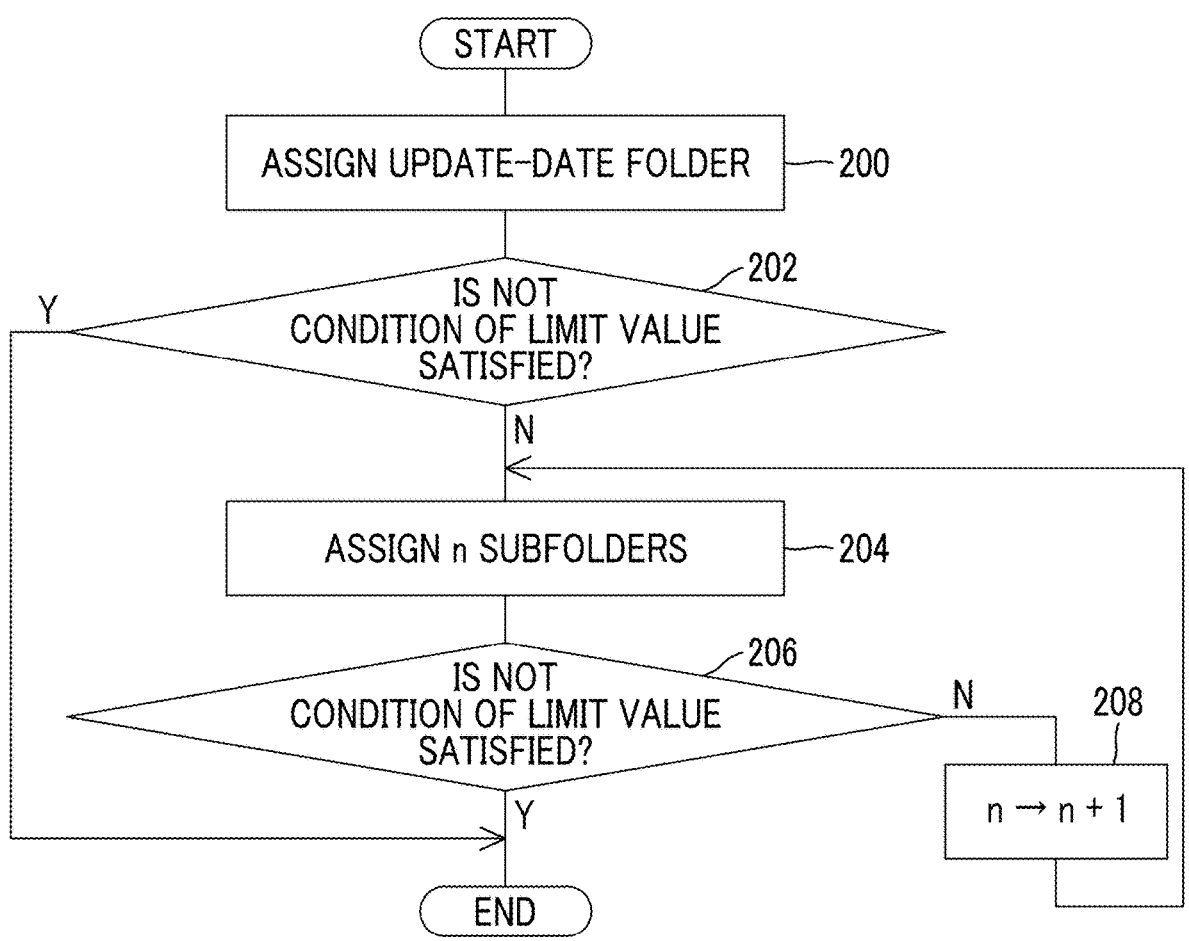
FIG. 18 is a flowchart illustrating an example of a flow of specific processes in a case where a limit is not satisfied even though classes are created for all extracted pieces of attribute information, in the data transferring processing performed by the transferring processing performing unit in the information processing system according to the exemplary embodiment.

Next, the data conversion processing performed by the transferring processing performing unit 22 in a case where the limit has not been satisfied even though classes have been created for all extracted pieces of attribute information will be described. FIG. 18 is a flowchart illustrating an example of a flow of specific processes in a case where the limit has not been satisfied even though classes have been created for all extracted pieces of attribute information, in the data transferring processing performed by the transferring processing performing unit in the information processing system 10 according to the exemplary embodiment.

In Step 200, the export determination function 28 assigns an update date folder and causes the process to proceed to Step 202.

In Step 202, the export determination function 28 determines whether or not a condition of the limit value is not satisfied. In a case where it is determined that the condition of the limit value is not satisfied, the process proceeds to Step 204. In a case where it is determined that the condition of the limit value is satisfied, a series of processing ends.

In Step 204, the export determination function 28 assigns n subfolders (n is a natural number) and causes the process to proceed to Step 206.

In Step 206, the export determination function 28 determines whether or not the condition of the limit value is not satisfied. In a case where it is determined that the condition of the limit value is not satisfied, the process proceeds to Step 208. In a case where it is determined that the condition of the limit value is satisfied, the series of processing ends.

In Step 208, the export determination function 28 sets n to (n+1), brings the process back to Step 204, and repeats the above-described processes. That is, n subfolders are assigned until the condition of the limit value is satisfied.

In the above exemplary embodiment, a case where information stored in the information processing apparatus 14 is transferred into the cloud server 16 is described as an example. However, it is not limited thereto. For example, a case where information stored in the cloud server 16 is transferred into another cloud server 16 may be applied.

The data transferring processing performed by the information processing system 10 according to the exemplary embodiment may be processing performed in software, in hardware, or in a combination of both the software and the hardware. The processes may be stored in a storage medium, in a form of a program, and may be distributed.

The present invention is not limited to the above descriptions, and various modifications may be made in a range without departing from the spirit of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor, configured to:
acquire source information of a transfer source, which includes a plurality of elements to which attribute information has been assigned, and limit information indicating a limit on the number of elements able to be stored in a transfer destination to which the source information is to be transferred; and
classify the elements by using the attribute information of each of the elements in the source information and generates a hierarchical structure of the source information by using a unit of a classification as a unit of a class, so as to correspond to the number of elements indicated by the limit information in the transfer destination,
wherein the source information has the hierarchical structure in which a plurality of elements to which the attribute information has been assigned is provided in each class obtained by stratification, and
wherein the limit information indicates the number of elements storable in a class in the transfer destination.

2. The information processing apparatus according to claim 1,
wherein the processor generates the classes for the source information until the number of the generated classes reaches the limit on the number of elements indicated by the limit information in the transfer destination.

3. The information processing apparatus according to claim 2, wherein the processor is further configured to:
set a priority order in a case where the attribute information is classified,
wherein the processor generates the hierarchical structure in accordance with the set priority order.

4. The information processing apparatus according to claim 1,
wherein the processor generates the classes in an order from a classification in which the number of elements is smallest among classifications, and generates the classes until the number of the generated classes reaches the limit on the number of elements indicated by the limit information.

5. The information processing apparatus according to claim 4, wherein the processor is further configured to:
set a priority order in a case where the attribute information is classified,
wherein the processor generates the hierarchical structure in accordance with the set priority order.

6. The information processing apparatus according to claim 1, wherein the processor is further configured to:
set a priority order in a case where the attribute information is classified,
wherein the processor generates the hierarchical structure in accordance with the set priority order.

7. The information processing apparatus according to claim 6, wherein the processor is further configured to:
perform a display control of displaying a classification result on a display; and
set a priority order in the classification result displayed on the display.

8. The information processing apparatus according to claim 1,
wherein the processor generates the hierarchical structure by using the classified attribute information as a class.

9. The information processing apparatus according to claim 1,
wherein, in a case where the limit on the number of elements indicated by the limit information in the transfer destination is not reached even though the classes corresponding to the number of pieces of the classified attribute information are created, the processor generates the hierarchical structure by using an update date as a unit of a class.

10. The information processing apparatus according to claim 9,
wherein, in a case where the limit on the number of elements indicated by the limit information in the transfer destination is not reached even though the hierarchical structure is generated by using the update date as the unit of the class, the processor generates a class of a subfolder.

11. The information processing apparatus according to claim 10,
wherein, in a case where the limit on the number of elements indicated by the limit information in the transfer destination is not reached even though the class of the subfolder is generated, the processor generates a folder under the subfolder until the limit on the number of elements indicated by the limit information in the transfer destination is reached.

12. An information processing system comprising:
the information processing apparatus according to claim 1; and
an information storing device that stores the source information in accordance with the hierarchical structure generated by the information processing apparatus.

13. A non-transitory computer readable medium storing an information processing program causing a computer to:
acquire source information of a transfer source, which includes a plurality of elements to which attribute information has been assigned, and limit information indicating a limit on the number of elements able to be stored in a transfer destination to which the source information is to be transferred; and
classify the elements by using the attribute information of each of the elements in the source information and generates a hierarchical structure of the source information by using a unit of a classification as a unit of a class, so as to correspond to the number of elements indicated by the limit information in the transfer destination,
wherein the source information has the hierarchical structure in which a plurality of elements to which the attribute information has been assigned is provided in each class obtained by stratification, and
wherein the limit information indicates the number of elements storable in a class in the transfer destination.

* * * * *